US012608490B2

(12) United States Patent
    Hojjati

(10) Patent No.:  US 12,608,490 B2
(45) Date of Patent:      Apr. 21, 2026

(54) TRACKING HASH-BASED SIGNATURES IN LMS AND XMSS USING A DISTRIBUTED LEDGER

(71) Applicant: DigiCert, Inc., Lehi, UT (US)

(72) Inventor: Avesta Hojjati, Austin, TX (US)

(73) Assignee: DigiCert, Inc., Lehi, UT (US)

( * ) Notice:    Subject to any disclaimer, the term of this patent is extended or adjusted under 35 U.S.C. 154(b) by 36 days.

(21) Appl. No.: 18/676,636

(22) Filed:    May 29, 2024

(65)            Prior Publication Data

US 2025/0371170 A1      Dec. 4, 2025

(51) Int. Cl.
    *G06F 21/60*            (2013.01)
(52) U.S. Cl.
    CPC .................................. *G06F 21/602* (2013.01)
(58) Field of Classification Search
    CPC .................................................... G06F 21/602
    See application file for complete search history.

(56)            References Cited

U.S. PATENT DOCUMENTS 12,231,580 B1 *   2/2025   McMahon ............ H04L 9/0897
    2023/0300129 A1   9/2023   Hojjati et al.
    2023/0344639 A1   10/2023  Hojjati 2023/0344650 A1   10/2023  Hojjati
    2023/0385811 A1   11/2023  Naidoo et al.
    2024/0048369 A1 *  2/2024  Kam ........................ H04L 9/50
    2024/0096051 A1   3/2024   Gopalakrishna et al.

OTHER PUBLICATIONS

"QRL Whitepaper", [retrieved on Aug. 28, 2025], from the Internet: <URL: https://docs.theqrl.org/build/fundamentals/whitepaper> (Year: 2016).*
Peter Waterland, "Statefulness and security", [retrieved on Aug. 28, 2025], from the Internet: <URL: https://www.theqrl.org/blog/statefulness-and-security/> (Year: 2017).*
Will Song, "Announcing two new LMS libraries", [retrieved on Aug. 28, 2025], from the Internet: <URL: https://blog.trailofbits.com/2024/04/26/announcing-two-new-lms-libraries/> (Year: 2024).*

* cited by examiner

*Primary Examiner* — Sangseok Park
(74) *Attorney, Agent, or Firm* — Baratta Law PLLC; Lawrence A. Baratta, Jr.

(57)            ABSTRACT

Tracking hash-based signatures using a distributed ledger includes, subsequent to generating a plurality of one-time signatures (OTSs) organized in a Merkle tree for use in a stateful hash-based digital signature scheme, receiving a request for a digital signature based therein; obtaining an OTS from the plurality of OTSs based on checking the distributed ledger; and creating a transaction on the distributed ledger based on the request to mark the OTS as used. The stateful hash-based digital signature scheme can be Leighton-Micali Signature (LMS) or extended Merkle Signature Scheme (XMSS).

20 Claims, 3 Drawing Sheets

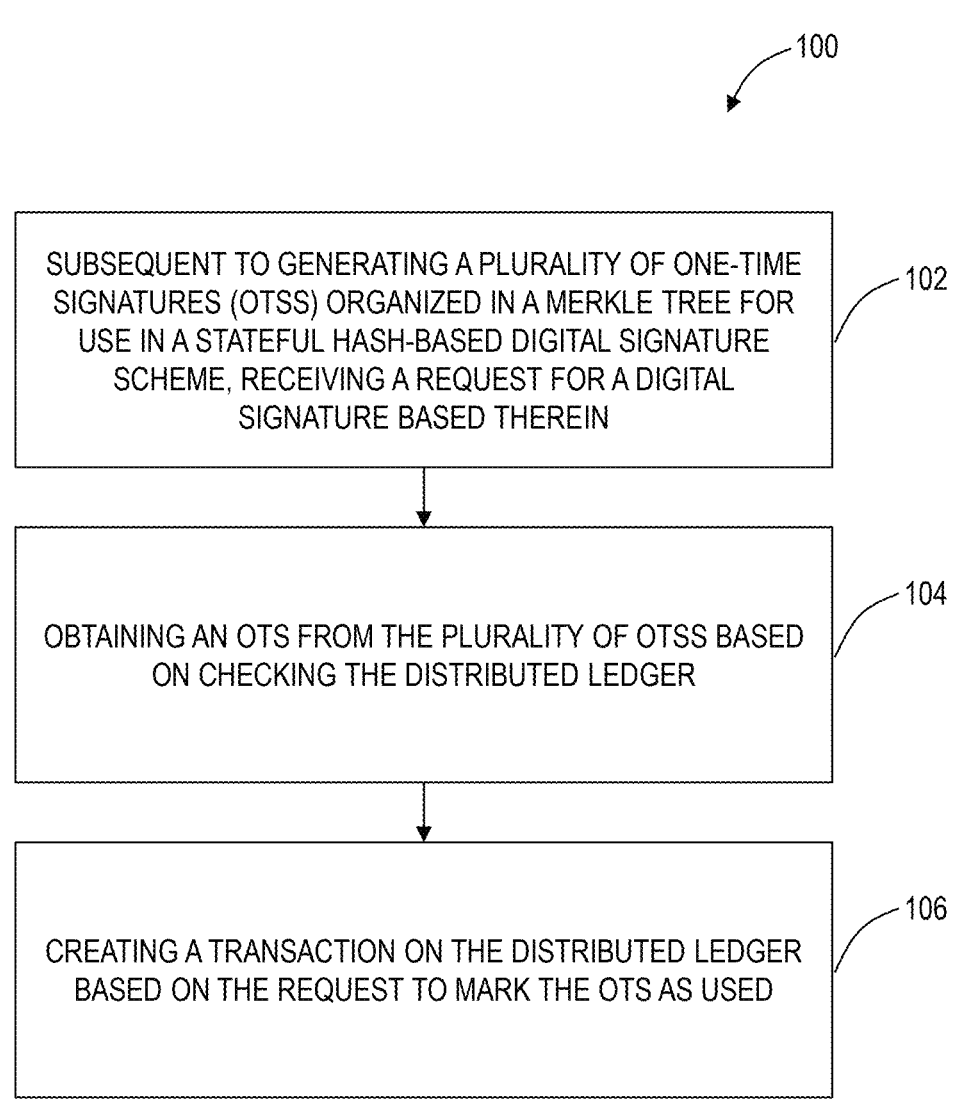

SUBSEQUENT TO GENERATING A PLURALITY OF ONE-TIME SIGNATURES (OTSS) ORGANIZED IN A MERKLE TREE FOR USE IN A STATEFUL HASH-BASED DIGITAL SIGNATURE SCHEME, RECEIVING A REQUEST FOR A DIGITAL SIGNATURE BASED THEREIN — 102

OBTAINING AN OTS FROM THE PLURALITY OF OTSS BASED ON CHECKING THE DISTRIBUTED LEDGER — 104

CREATING A TRANSACTION ON THE DISTRIBUTED LEDGER BASED ON THE REQUEST TO MARK THE OTS AS USED — 106

_FIG. 2_

TRACKING HASH-BASED SIGNATURES IN LMS AND XMSS USING A DISTRIBUTED LEDGER

FIELD OF THE DISCLOSURE

The present disclosure relates generally to networking and computing. More particularly, the present disclosure relates to systems and methods for tracking hash-based signatures in Leighton-Micali Signature (LMS) and extended Merkle Signature Scheme (XMSS) using a distributed ledger.

BACKGROUND OF THE DISCLOSURE

Given the rapid advancements in quantum computing, there is a risk that data encrypted with current methods could be decrypted in the future by a powerful quantum computer. Post-quantum cryptography (PQC) aims to develop algorithms that are secure against quantum attacks, ensuring the longevity and security of encrypted data. LMS and XMSS are both stateful hash-based digital signature schemes and examples of PQC algorithms designed to provide security against quantum attacks. The National Institute of Standards and Technology (NIST) is working on standardizing PQC algorithms, including LMS and XMSS. This standardization is crucial for widespread adoption and interoperability. Both LMS and XMSS use similar underlying principles involving hash functions and Merkle trees to generate and verify digital signatures. There is a need for an efficient approach to track the use of these signatures, ensuring there are no collisions, i.e., where a single signature is used more than once.

BRIEF SUMMARY OF THE DISCLOSURE

The present disclosure relates to systems and methods for tracking hash-based signatures in Leighton-Micali Signature (LMS) and extended Merkle Signature Scheme (XMSS) using a distributed ledger. In particular, the present disclosure provides a distributed ledger approach using blockchain to track the use of signatures in LMS and XMSS. Such a distributed ledger logs an entire hash tree (Merkle tree) and its corresponding Hardware Security Modules (HSMs), marks what signature has been used for any tree, and prevents issuance of any additional signature if a request is for a same signature. We note the use of a distributed ledger can solve a so-called double signing problem, which is similar to the double spending problem in Blockchain. Conventional solutions to signature management have either used (1) a centralized database which has performance issues, lacks transparency, and could cause collisions or (2) a time delay until a next signature is obtained which significantly impacts performance.

In various embodiments, the present disclosure includes a method having steps, via a computing environment with one or more processors configured to implement the steps, and as a non-transitory computer-readable medium storing instructions that, when executed, cause one or more processors to implement the steps. In an embodiment, the steps are implemented by an HSM or the like. The steps include, subsequent to generating a plurality of one-time signatures (OTSs) organized in a Merkle tree for use in a stateful hash-based digital signature scheme, receiving a request for a digital signature based therein; obtaining an OTS from the plurality of OTSs based on checking the distributed ledger; and creating a transaction on the distributed ledger based on the request to mark the OTS as used. The steps also include determining there are no transactions with the OTS.

The checking the distributed ledger can include determining there is a transaction with a second OTS of the plurality of OTSs and selecting the OTS based on there being no transactions associated therewith. The creating the transaction causes a lock on the OTS to prevent a race condition where another attempts to use the OTS prior to the transaction being added to the distributed ledger. The transaction can include an identifier associated with the request. The identifier can note a specific Hardware Security Module (HSM) of a plurality of HSMs and the Merkle tree of a plurality of Merkle trees. In an embodiment, the stateful hash-based digital signature scheme is Leighton-Micali Signature (LMS). In another embodiment, the stateful hash-based digital signature scheme is extended Merkle Signature Scheme (XMSS).

BRIEF DESCRIPTION OF THE DRAWINGS

The present disclosure is detailed through various drawings, where like components or steps are indicated by identical reference numbers for clarity and consistency.

FIG. 2 is a flowchart of a process for tracking hash-based signatures in LMS and XMSS using a distributed ledger.

DETAILED DESCRIPTION OF THE DISCLOSURE

Again, the present disclosure relates to systems and methods for tracking hash-based signatures in Leighton-Micali Signature (LMS) and extended Merkle Signature Scheme (XMSS) using a distributed ledger.

LMS and XMSS Overview

LMS is a stateful hash-based digital signature scheme designed to provide secure and efficient signatures, particularly in the context of post-quantum cryptography. It uses Merkle trees and one-time signature (OTS) schemes. LMS uses one-time signature schemes like Winternitz OTS to sign individual messages. Each OTS key pair is used only once to ensure security. A Merkle tree organizes the hashes of the public keys of the one-time signatures. The root of the Merkle tree serves as the public key for the LMS scheme. XMSS is another stateful hash-based digital signature scheme that builds on the principles of LMS but includes optimizations and enhancements to improve security and efficiency. It is also designed to be secure against quantum attacks. As described herein, an OTS is a hash-based signature.

Figure 1:
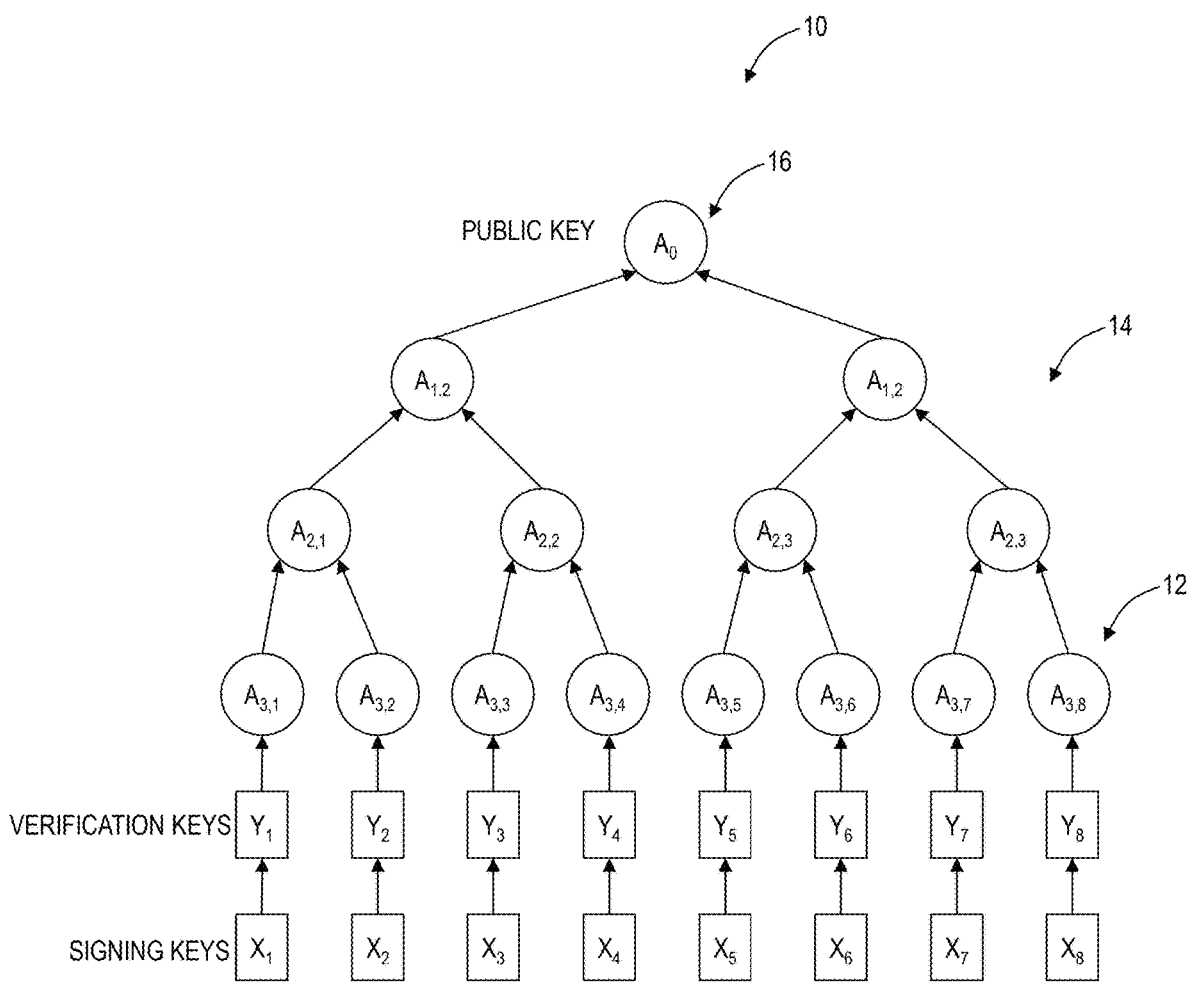
FIG. 1 is an example Merkle tree used for keys in LMS or XMSS.

FIG. 1 is an example Merkle tree 10 used for keys in LMS or XMSS. The Merkle tree 10 is a cryptographic data structure that efficiently and securely verifies the integrity and authenticity of large datasets. In the context of digital signatures, such as in LMS and XMSS, the Merkle tree 10 provides a way to aggregate many one-time signatures into a single public key (Ao). The Merkle tree 10 includes leaf nodes 12, intermediate nodes 14, and a root node 16. The leaf nodes 12 represent the hash of the public keys from one-time signature (OTS) schemes and each corresponds to a one-time public key, which is part of the overall signing key. These public keys are used to verify the one-time signatures. The intermediate nodes 14 combine hashes from the level below to eventually form the root node 16. These intermediate nodes 14 are used to build the tree structure by hashing pairs of child nodes to form parent nodes, ensuring the integrity and authenticity of the leaf nodes 14. The root node 16 is the topmost node of the Merkle tree 10, representing the overall hash of all the leaf nodes 12. The root node 16 is the public verification key. It acts as a compact representation of all the OTS public keys and is used in the verification process.

The signing keys in LMS and XMSS are the private keys used to generate digital signatures. These keys are used for creating one-time signatures of documents. Each leaf node 14 in the Merkle tree 10 corresponds to an OTS key pair (a private key and a public key). An OTS private key is used to sign a single document. Once used, it should not be reused to maintain security, which is the purpose of the present disclosure. When signing a document, an unused OTS private key is selected, i.e., a leaf node 12. The document is hashed, and the resulting hash is signed with the OTS private key to create the signature. The OTS signature, along with an index indicating which OTS key was used and an authentication path in the Merkle tree 10, forms the complete signature.

The verification keys in LMS and XMSS are the public keys used to verify the digital signatures. These keys correspond to the root node 16 of the Merkle tree 10. Here's how they are managed and used: The OTS public keys are hashed to create the leaf nodes 12 of the Merkle tree. To verify a signature, the recipient uses the root node 16 (the verification key) and the authentication path provided in the signature. The recipient hashes the document and uses the OTS public key (provided as part of the signature) to verify the OTS signature. The recipient then uses the authentication path to recompute the root hash from the OTS public key's hash. If the recomputed root hash matches the stored public verification key, the signature is valid.

In operation, the Merkle tree 10 is pre-generated during a key generation phase. This process involves generating all necessary one-time signature (OTS) key pairs, computing their public keys, and constructing the Merkle tree from these public keys. The Merkle tree 10 and the OTS key pairs are pre-generated and stored. This allows the signing process to simply select an unused OTS key pair and use the pre-generated authentication path for efficient signature verification.

Advantages include:

(1) Efficiency in Signing: With pre-generated OTS key pairs and a constructed Merkle tree 10, the signing process becomes efficient. Selecting an OTS key pair and computing the necessary authentication path can be done quickly, reducing the computational load during signing.

(2) Security: Pre-generating the Merkle tree 10 and OTS key pairs ensures that the structure of the tree and the relationships between nodes are fixed. This reduces the risk of errors and potential vulnerabilities that might arise from on-the-fly generation.

(3) Scalability: Pre-generating the entire key structure allows for scalable use of the signature scheme. The number of OTS key pairs (and thus the number of possible signatures) is predetermined, making it straightforward to manage the key lifecycle.

HSMs

HSMs are dedicated devices (whether physical, virtual, on-premises, cloud-based, etc.) designed to protect and manage cryptographic keys and operations. HSMs generate a large number of OTS key pairs securely. This process ensures that the private keys never leave the secure confines of the HSM, protecting them from unauthorized access. The HSM computes the hash of each OTS public key to form the leaf nodes 12 of the Merkle tree 10. The HSM constructs the Merkle tree 10 by hashing pairs of child node hashes to form parent nodes, continuing this process up to the root node 16. The root node 16 of the Merkle tree 10 becomes the public key for the LMS or XMSS scheme. The HSM securely stores the Merkle tree 10, including the OTS key pairs and the root node 16.

Signing Process with HSM (1) Selecting an OTS Key Pair: When a document needs to be signed, the HSM selects an unused OTS key pair. The selection process ensures that each OTS key pair is only used once, maintaining the integrity of the one-time signature scheme.

(2) Hashing the Document: The document is hashed using a cryptographic hash function. The HSM performs this operation internally to ensure the hash value is secure.

(3) Creating the OTS Signature: The HSM signs the document hash using the selected OTS private key, producing an OTS signature. Since the private key never leaves the HSM, the signing operation is secure.

(4) Generating the Authentication Path: The HSM generates the authentication path for the selected OTS public key within the Merkle tree 10. This path includes the necessary sibling hashes to verify the leaf node's 12 hash up to the root node 16.

(5) Signature Composition: The final signature include the OTS signature, the index of the OTS key pair, and the authentication path. This composite signature is then output by the HSM.

Verification Process (1) Receiving the Signature: The recipient receives the document along with the composite signature generated by the HSM.

(2) Hashing the Document: The recipient hashes the document independently to produce a hash value.

(3) Verifying the OTS Signature: The recipient uses the OTS public key (included in the signature) and the document hash to verify the OTS signature.

(4) Recomputing the Leaf Hash: The recipient computes the hash of the OTS public key to get the leaf node hash.

(5) Verifying the Authentication Path: The recipient uses the authentication path to recompute the root hash from the leaf node hash. If the recomputed root hash matches the public key (root hash) stored or provided, the signature is verified as authentic.

Problem Statement

Practically, the approach described herein allows for fast signing in high volumes. There needs to be a guaranteed and efficient approach to ensuring an OTS key pair (leaf node 12) from the Merkle tree 10 is only used once. Reusing an OTS key pair in the Merkle tree can lead to serious security vulnerabilities, such as:

(1) Key Exposure Risk (a) One-Time Nature: OTS key pairs are designed to be used only once. Reusing them increases the risk that an attacker could analyze the reused keys and signatures to deduce the private key.

(b) Partial Key Exposure: Each time a key pair is used, part of the private key information is exposed. Reusing the same key pair multiple times makes it easier for an attacker to piece together the entire private key.

(2) Cryptographic Weakness
   (a) Hash Collisions: The security of OTS schemes relies on the difficulty of finding hash collisions. Reusing keys increases the chances of collision attacks, where different messages produce the same hash, compromising the integrity of the signatures.
   (b) Signature Forgery: An attacker could use known signatures to forge new signatures. By having access to multiple signatures from the same key pair, they can potentially forge a valid signature for a fraudulent message.
(3) Integrity and Authenticity
   (a) Non-Repudiation Issues: If the same key pair is reused, it becomes challenging to ensure the integrity and authenticity of the messages. An attacker could claim that a forged message was signed by the legitimate signer, undermining the non-repudiation property.
   (b) Trust Compromise: The foundational trust in the Merkle tree 10 structure depends on the uniqueness and integrity of each key pair. Reusing key pairs erodes this trust, compromising the entire tree's reliability.
(4) Loss of Forward Secrecy
   (a) Compromise of Future Security: Forward secrecy ensures that the compromise of one key does not affect the security of future keys. Reusing OTS key pairs negates this property, meaning that if a reused key is compromised, all signatures associated with that key are also compromised, both past and future.
   For example, imagine an OTS key pair used for signing software updates. If the same key pair is reused for multiple updates, an attacker who gains access to one signed update could potentially reverse-engineer the private key and create malicious updates that appear legitimate.
Fast Signing
   In a practical use case, the Merkle tree 10 is pre-generated and used with HSMs to perform so-called fast signing. For example, a manufacturing facility makes some digital devices (e.g., Internet-of-Things (IoT) devices), each of which needs to be securely updated and authenticated, and there is a need for fast signing to allow rapid production of such devices. The pre-generated OTS key pairs and Merkle tree 10 structure allow for rapid signing of such devices. Each signing operation is efficient since it uses a one-time private key and a straightforward hash computation for the authentication path. Now, the problem becomes how to similarly track the use of the OTS key pairs to guarantee no reuse. Again, we do not want to use delay as this defeats the purpose and a centralized database is inefficient, non-transparent, etc.
Double Signing Problem
   In such fast or rapid signing situations, there are probabilities of OTS key pair reuse what we call a double signing problem. The double signing problem is where an OTS key pair is used twice, such as in digital currency where the problem is called the double spending problem. In both cases, the object is digital (i.e., OTS key pair or digital currency) which unlike a physical object can be easily duplicated. To solve this double signing problem, especially in fast or rapid signing situations, the present disclosure tracks OTS key pair usage on a distributed ledger.
Distributed Ledger
   A distributed ledger is a distributed database that is consensually shared, replicated, and synchronized across multiple sites, institutions, or geographies. It enables transactions to have public "witnesses," thereby making a cyberattack more difficult. The security and accuracy of the assets stored in the ledger are maintained cryptographically through the use of "keys" and signatures. A distributed ledger includes a plurality of nodes which are the individual computers or devices that participate in the network. Each node maintains a copy of the ledger. Transactions are the operations that change the state of the ledger. In the present disclosure, transactions involve use of OTS key pairs. Transactions are grouped together into blocks. Each block typically contains a list of transactions, a timestamp, and a reference (hash) to the previous block, forming a chain. The consensus mechanism is the protocol by which nodes agree on the state of the ledger. Common consensus mechanisms include Proof of Work (PoW), Proof of Stake (POS), and Practical Byzantine Fault Tolerance (PBFT).
   An example overview includes:
(1) Transaction Creation
   (a) Initiation: A transaction is created by a participant in the network. This transaction includes use of an OTS key pair.
   (b) Broadcasting: The transaction is broadcast to the network so that all nodes receive the new transaction.
(2) Validation
   (a) Verification: Each node independently verifies the transaction against a set of predefined rules. Here, nodes check if the OTS key pair in the transaction has been used before or is locked, meaning there is another signer looking to use this OTS key pair but it has not been added yet.
   (b) Digital Signatures: Transactions are signed digitally by the sender using cryptographic keys. Nodes verify these signatures to ensure authenticity.
(3) Consensus
   (a) Proposing a Block: In blockchain-based ledgers, a special node (miner or validator) groups verified transactions into a block and proposes it to the network.
   (b) Consensus Protocol: Nodes engage in a consensus process to agree on which proposed block should be added to the ledger. This process varies depending on the consensus mechanism:
   (i) Proof of Work (PoW): Miners compete to solve a cryptographic puzzle. The first to solve it gets to propose the next block and is rewarded.
   (ii) Proof of Stake (POS): Validators are chosen to propose and validate the next block based on the number of tokens they hold and are willing to "stake" as collateral.
   (iii) Practical Byzantine Fault Tolerance (PBFT): Nodes exchange messages to agree on the next block, ensuring consistency even if some nodes act maliciously.
(4) Block Addition and Replication
   (a) Block Addition: Once a consensus is reached, the proposed block is added to the chain, updating the ledger.
   (b) Replication: The updated ledger is replicated across all nodes in the network. Each node updates its copy to reflect the new state.
(5) Finalization and Immutability
   (a) Finalization: After a block is added, it becomes a permanent part of the ledger. Subsequent blocks reference the previous block, making alterations difficult.
   (b) Immutability: The cryptographic linking of blocks ensures that changing any part of the ledger would require altering all subsequent blocks, which is computationally impractical.
Process for Tracking Hash-Based Signatures in LMS and XMSS Using a Distributed Ledger
   FIG. 2 is a flowchart of a process 100 for tracking hash-based signatures in LMS and XMSS using a distributed ledger. The process 100 contemplates implementation as a method having steps, via a computing environment with one or more processors configured to implement the steps, and as a non-transitory computer-readable medium storing instructions that, when executed, cause one or more processors to implement the steps. In an embodiment, the process 100 is implemented by an HSM or the like.

The process 100 includes, subsequent to generating a plurality of one-time signatures (OTSs) organized in a Merkle tree for use in a stateful hash-based digital signature scheme, receiving a request for a digital signature based therein (step 102); obtaining an OTS from the plurality of OTSs based on checking the distributed ledger (step 104); and creating a transaction on the distributed ledger based on the request to mark the OTS as used (step 106). The checking the distributed ledger includes determining there are no transactions with the OTS. In an embodiment, the checking the distributed ledger includes determining there is a transaction with a second OTS of the plurality of OTSs and selecting the OTS based on there being no transactions associated therewith.

The creating the transaction causes a lock on the OTS to prevent a race condition where another attempts to use the OTS prior to the transaction being added to the distributed ledger. The transaction includes an identifier associated with the request. The identifier can note a specific Hardware Security Module (HSM) of a plurality of HSMs and the Merkle tree of a plurality of Merkle trees. In an embodiment, the stateful hash-based digital signature scheme is Leighton-Micali Signature (LMS). In another embodiment, the stateful hash-based digital signature scheme is extended Merkle Signature Scheme (XMSS).

Computing Environment

Figure 3:
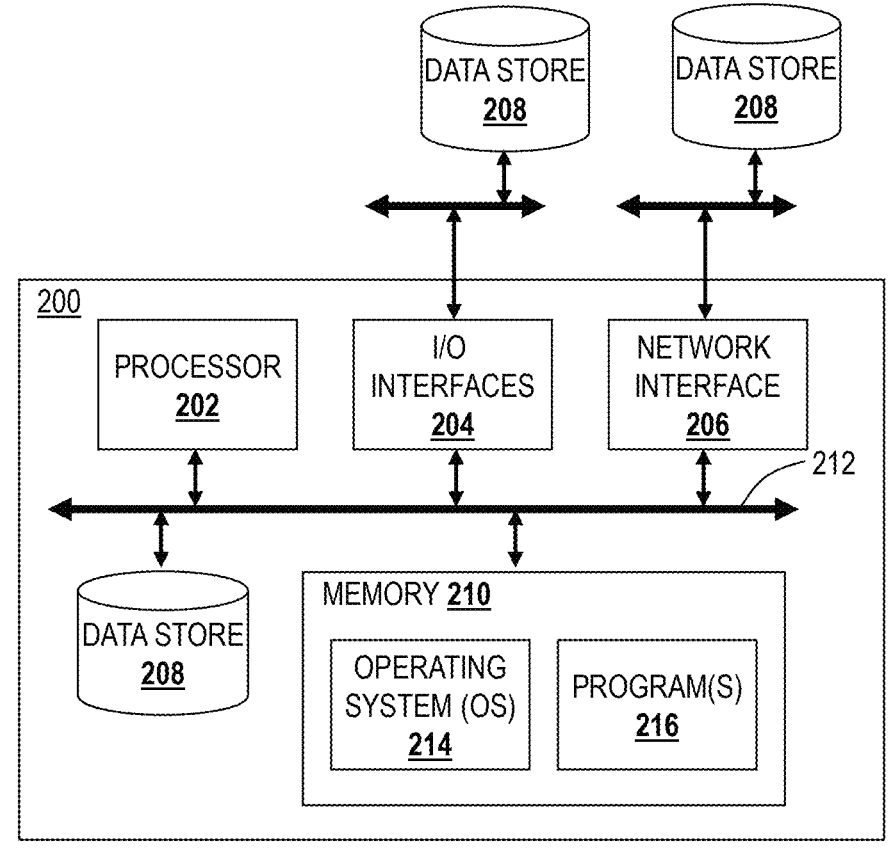
FIG. 3 is a block diagram of a computing environment, which may be one or more digital computers, virtual machines, servers, clusters, HSMs, etc.

FIG. 3 is a block diagram of a computing environment 200, which may be one or more digital computers, virtual machines, servers, clusters, HSMs, etc. The computing environment 200 generally includes one or more processors 202, input/output (I/O) interfaces 204, a network interface 206, a data store 208, and memory 210. It is important to note that FIG. 3 provides an oversimplified view of the computing environment 200, and a practical embodiment may include additional components and suitably configured processing logic to support conventional operating features not detailed here. The components (202, 204, 206, 208, and 210) communicate via a local interface 212, which include one or more buses or other wired or wireless connections known in the art. The local interface 212 may also include additional elements such as controllers, buffers (caches), drivers, repeaters, and receivers to facilitate communications. Furthermore, the local interface 212 includes address, control, and/or data connections to enable appropriate communications among the aforementioned components.

The processor 202 is a hardware device designed to execute software instructions. It can be a custom-made or commercially available processor, namely any device capable of executing software instructions. When the computing environment 200 is operational, the processor 202 executes software stored in the memory 210, communicates data to and from the memory 210, and generally controls the operations of the computing environment 200 based on the software instructions. The I/O interfaces 204 are used to receive user input from and provide system output to one or more devices or components. The network interface 206 enables the computing environment 200 to communicate on a network, such as the Internet 104. The network interface 206 includes address, control, and/or data connections to enable appropriate communications on the network.

The data store 208 is used to store data and includes volatile memory elements, nonvolatile memory elements, and combinations thereof. For instance, it may be an internal hard drive connected to the local interface 212 within the computing environment 200. Alternatively, the data store 208 could be an external hard drive connected to the I/O interfaces 204 (e.g., via SCSI or USB connection) or a network-attached file server. The memory 210 includes volatile memory elements, nonvolatile memory elements, and combinations thereof. The data store 208 and memory 210 incorporate electronic, magnetic, optical, and/or other types of storage media. The memory 210 may have a distributed architecture, with components situated remotely but accessible by the processor 202. The software in memory 210 includes one or more programs, each containing an ordered list of executable instructions for implementing logical functions. The memory 210 includes a suitable Operating System (O/S) 214 and one or more programs 216. The operating system 214 controls the execution of other computer programs, such as the one or more programs 216, and provides scheduling, input-output control, file and data management, memory management, communication control, and related services. The one or more programs 216 may implement the various processes, algorithms, methods, techniques, etc., described herein.

In some embodiments, the computing environment 200 is a cloud system. Cloud computing systems and methods abstract away physical servers, storage, and networking, offering these as on-demand and elastic resources. The National Institute of Standards and Technology (NIST) defines cloud computing as a model for enabling convenient, on-demand network access to a shared pool of configurable computing resources (e.g., networks, servers, storage, applications, and services) that can be rapidly provisioned and released with minimal management effort or service provider interaction. The phrase "Software as a Service" (SaaS) is often used to describe application programs offered through cloud computing. The term "the cloud" is commonly used as shorthand for a provided cloud computing service or an aggregation of all existing cloud services.

In another embodiment, the computing environment 200 is an HSM. A Hardware Security Module (HSM) is a specialized, tamper-resistant hardware device designed to securely manage and protect cryptographic keys and perform cryptographic operations such as encryption, decryption, and digital signatures. HSMs provide a high level of security by isolating cryptographic processes from general-purpose computing environments, reducing the risk of key exposure and unauthorized access. They are equipped with dedicated cryptographic processors and secure memory to ensure that sensitive data remains protected even in the event of physical tampering. HSMs are widely used in various industries to secure financial transactions, protect sensitive information, and ensure compliance with stringent security standards.

Further, those skilled in the art will recognize that the various embodiments may include processing circuitry of various types. The processing circuitry might include, but are not limited to, general-purpose microprocessors; Central Processing Units (CPUs); Digital Signal Processors (DSPs); specialized processors such as Network Processors (NPs) or Network Processing Units (NPUs), Graphics Processing Units (GPUs); Field Programmable Gate Arrays (FPGAs); or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more Application-Specific Integrated Circuits (ASICs), where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each potentially equipped with one or more processors. These instructions, when executed, enable the system to perform the functions as delineated and claimed in this document. Such non-transitory computer-readable storage mediums can include, but are not limited to, hard disks, optical storage devices, magnetic storage devices, Read-Only Memory (ROM), Programmable Read-Only Memory (PROM), Erasable Programmable Read-Only Memory (EPROM), Electrically Erasable Programmable Read-Only Memory (EEPROM), Flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

CONCLUSION

While the present disclosure has been detailed and depicted through specific embodiments and examples, it is to be understood by those skilled in the art that numerous variations and modifications can perform equivalent functions or yield comparable results. Such alternative embodiments and variations, which may not be explicitly mentioned but achieve the objectives and adhere to the principles disclosed herein, fall within its spirit and scope. Accordingly, they are envisioned and encompassed by this disclosure, warranting protection under the claims associated herewith. That is, the present disclosure anticipates combinations and permutations of the described elements, operations, steps, methods, processes, algorithms, functions, techniques, modules, circuits, etc., in any manner conceivable, whether collectively, in subsets, or individually, further broadening the ambit of potential embodiments. Also, in the claims, the terms "comprise," "comprises," "comprising," "include," "includes," and "including" are intended to be non-limiting and open-ended. These terms specifically list essential elements or steps but do not exclude additional elements or steps. This applies even when a claim or series of claims includes more than one of these terms.

What is claimed is:

1. A method for tracking hash-based signatures using a distributed ledger, the method comprising steps of:
   subsequent to generating a plurality of one-time signatures (OTSs) organized in a Merkle tree for use in a stateful hash-based digital signature scheme, receiving a request for a digital signature based therein;
   obtaining an OTS from the plurality of OTSs based on checking the distributed ledger; and
   creating a transaction on the distributed ledger based on the request to mark the OTS as used, wherein the creating the transaction causes a lock on the OTS to prevent a race condition where there are other attempts to use the OTS prior to the transaction being added to the distributed ledger.

2. The method of claim 1, wherein the checking the distributed ledger includes:
   determining there are no transactions with the OTS.

3. The method of claim 1, wherein the checking the distributed ledger includes:
   determining there is a transaction with a second OTS of the plurality of OTSs and selecting the OTS based on there being no transactions associated therewith.

4. The method of claim 1, wherein the transaction includes an identifier associated with the request.

5. The method of claim 4, wherein the identifier notes a specific Hardware Security Module (HSM) of a plurality of HSMs and the Merkle tree of a plurality of Merkle trees.

6. The method of claim 1, wherein the stateful hash-based digital signature scheme is Leighton-Micali Signature (LMS).

7. The method of claim 1, wherein the stateful hash-based digital signature scheme is extended Merkle Signature Scheme (XMSS).

8. The method of claim 1, wherein the checking the distributed ledger includes:
   determining there are no transactions with the OTS.

9. The method of claim 1, wherein the checking the distributed ledger includes:
   determining there is a transaction with a second OTS of the plurality of OTSs and selecting the OTS based on there being no transactions associated therewith.

10. The method of claim 1, wherein the creating the transaction causes a lock on the OTS to prevent a race condition where another attempts to use the OTS prior to the transaction being added to the distributed ledger.

11. The method of claim 1, wherein the stateful hash-based digital signature scheme is Leighton-Micali Signature (LMS).

12. The method of claim 1, wherein the stateful hash-based digital signature scheme is eXtended Merkle Signature Scheme (XMSS).

13. A system for tracking hash-based signatures using a distributed ledger, the system comprising:
   one or more processors and memory storing instructions that, when executed, cause the one or more processors to
      subsequent to generation of a plurality of one-time signatures (OTSs) organized in a Merkle tree for use in a stateful hash-based digital signature scheme, receive a request for a digital signature based therein;
      obtain an OTS from the plurality of OTSs based on checking the distributed ledger; and
      create a transaction on the distributed ledger based on the request to mark the OTS as used, wherein, once the transaction is created, there is a lock on the OTS to prevent a race condition there are other attempts to use the OTS prior to the transaction being added to the distributed ledger.

14. The system of claim 13, wherein the checking the distributed ledger includes:
   a determination that there are no transactions with the OTS.

15. The system of claim 13, wherein the checking the distributed ledger includes:

a determination there is a transaction with a second OTS of the plurality of OTSs and the OTS is selected based on there being no transactions associated therewith.

16. The system of claim 13, wherein the transaction includes an identifier associated with the request.

17. The system of claim 16, wherein the identifier notes a specific Hardware Security Module (HSM) of a plurality of HSMs and the Merkle tree of a plurality of Merkle trees.

18. The system of claim 13, wherein the stateful hash-based digital signature scheme is Leighton-Micali Signature (LMS).

19. The system of claim 13, wherein the stateful hash-based digital signature scheme is extended Merkle Signature Scheme (XMSS).

20. A method for tracking hash-based signatures using a distributed ledger, the method comprising steps of:

subsequent to generating a plurality of one-time signatures (OTSs) organized in a Merkle tree for use in a stateful hash-based digital signature scheme, receiving a request for a digital signature based therein;

obtaining an OTS from the plurality of OTSs based on checking the distributed ledger; and creating a transaction on the distributed ledger based on the request to mark the OTS as used, wherein the transaction includes an identifier associated with the request, and wherein the identifier notes a specific Hardware Security Module (HSM) of a plurality of HSMs and the Merkle tree of a plurality of Merkle trees.

\* \* \* \* \*